United States Patent
Poplett et al.

(10) Patent No.: US 7,682,921 B2
(45) Date of Patent: Mar. 23, 2010

(54) METHOD AND APPARATUS FOR INTERCONNECTING ELECTRODES WITH PARTIAL TITANIUM COATING

(75) Inventors: James M. Poplett, Plymouth, MN (US); Jeannette C. Polkinghorne, St. Anthony, MN (US); Gregory J. Sherwood, North Oaks, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 30 days.

(21) Appl. No.: 12/048,151

(22) Filed: Mar. 13, 2008

(65) Prior Publication Data

US 2008/0155800 A1      Jul. 3, 2008

Related U.S. Application Data

(62) Division of application No. 11/124,706, filed on May 9, 2005, now Pat. No. 7,352,560.

(60) Provisional application No. 60/588,905, filed on Jul. 16, 2004.

(51) Int. Cl.
*H01L 21/20* (2006.01)
(52) U.S. Cl. .............. 438/381; 29/25.03; 429/161; 429/162
(58) Field of Classification Search .......... 29/25.03; 429/161, 162; 438/381
See application file for complete search history.

(56) References Cited

U.S. PATENT DOCUMENTS

| | | | |
|---|---|---|---|
| 4,086,148 A | 4/1978 | Badia | |
| 4,932,497 A | 6/1990 | Raso | |
| 5,439,760 A | 8/1995 | Howard et al. | |
| 5,628,801 A | 5/1997 | MacFarlane et al. | |
| 5,660,737 A | 8/1997 | Elias et al. | |
| 5,715,133 A | 2/1998 | Harrinton et al. | |
| 5,800,724 A | 9/1998 | Habeger et al. | |

(Continued)

FOREIGN PATENT DOCUMENTS

JP      52-004051      1/1977

(Continued)

OTHER PUBLICATIONS

U.S. Appl. No. 11/124,706, Non-Final Office Action mailed Jun. 27, 2007, 11 pgs.

(Continued)

*Primary Examiner*—Charles D Garber
*Assistant Examiner*—Bryan Junge
(74) *Attorney, Agent, or Firm*—Schwegman, Lundberg & Woessner, P.A.

(57) ABSTRACT

The present subject matter includes a capacitor stack having a plurality of anode layers, and a plurality of cathodic metal substrates partially coated in a titanium coating. Cathode portions lacking titanium enable weld interconnections which are substantially free of titanium, improving capacitor properties. In some embodiments, anodes are interspersed among cathodes, and are electrically separated from the cathodes, with portions of cathode material attached to the welding area of the anode. These portions of the cathode material are no longer electrically connected to the cathode. As the anode and these cathode portions are welded and aged, leakage current is reduced due to improved oxide growth in the welding area due to the absence of titanium.

22 Claims, 11 Drawing Sheets

U.S. PATENT DOCUMENTS

| | | | |
|---|---|---|---|
| 5,801,917 A | | 9/1998 | Elias |
| 5,814,082 A | | 9/1998 | Fayram et al. |
| 5,867,363 A | | 2/1999 | Tsai et al. |
| 5,908,151 A | | 6/1999 | Elias |
| 5,922,215 A | | 7/1999 | Pless et al. |
| 5,926,362 A | | 7/1999 | Muffoletto et al. |
| 5,930,109 A | | 7/1999 | Fishler |
| 5,935,728 A | * | 8/1999 | Spillman et al. ............. 429/94 |
| 5,963,418 A | | 10/1999 | Greenwood, Jr. et al. |
| 5,968,210 A | | 10/1999 | Strange et al. |
| 5,983,472 A | | 11/1999 | Fayram et al. |
| 6,118,651 A | | 9/2000 | Mehrotra et al. |
| 6,208,502 B1 | | 3/2001 | Hudis et al. |
| 6,249,423 B1 | | 6/2001 | O'Phelan et al. |
| 6,275,729 B1 | | 8/2001 | O'Phelan et al. |
| 6,299,752 B1 | | 10/2001 | Strange et al. |
| 6,334,879 B1 | | 1/2002 | Muffoletto et al. |
| 6,402,793 B1 | | 6/2002 | Miltich et al. |
| 6,442,015 B1 | | 8/2002 | Niiori et al. |
| 6,556,863 B1 | | 4/2003 | O'Phelan et al. |
| 6,687,116 B2 | | 2/2004 | Hudis |
| 6,687,118 B1 | | 2/2004 | O'Phelan et al. |
| 6,699,265 B1 | | 3/2004 | O'Phelan et al. |
| 6,709,946 B2 | | 3/2004 | O'Phelan et al. |
| 6,795,299 B2 | | 9/2004 | Naito |
| 6,833,987 B1 | | 12/2004 | O'Phelan |
| 6,858,126 B1 | | 2/2005 | Hemphill et al. |
| 6,882,045 B2 | | 4/2005 | Massingill et al. |
| 6,885,887 B2 | | 4/2005 | O'Phelan et al. |
| 6,890,363 B1 | | 5/2005 | Sakai et al. |
| 7,352,560 B2 | | 4/2008 | Poplett et al. |
| 2002/0048145 A1 | | 4/2002 | Hudis et al. |
| 2002/0071240 A1 | | 6/2002 | Rorvick et al. |
| 2002/0108221 A1 | | 8/2002 | Miltich et al. |
| 2002/0155661 A1 | | 10/2002 | Massingill et al. |
| 2002/0176221 A1 | | 11/2002 | Hudis |
| 2003/0007317 A1 | | 1/2003 | Hudis |
| 2003/0011964 A1 | | 1/2003 | Hudis |
| 2003/0011967 A1 | | 1/2003 | Nielson et al. |
| 2003/0072124 A1 | * | 4/2003 | O'Phelan et al. ......... 361/301.4 |
| 2003/0072128 A1 | | 4/2003 | Hudis et al. |
| 2003/0077509 A1 | * | 4/2003 | Probst et al. ................ 429/162 |
| 2003/0090860 A1 | | 5/2003 | Naito |
| 2004/0052032 A1 | | 3/2004 | Monden et al. |
| 2004/0057194 A1 | | 3/2004 | Hudis et al. |
| 2004/0141282 A1 | | 7/2004 | Hudis |
| 2004/0147960 A1 | | 7/2004 | O'Phelan et al. |
| 2004/0147961 A1 | | 7/2004 | O'Phelan et al. |
| 2004/0174658 A1 | | 9/2004 | O'Phelan et al. |
| 2004/0215281 A1 | | 10/2004 | O'Phelan et al. |
| 2004/0220627 A1 | | 11/2004 | Crespi et al. |
| 2004/0233615 A1 | | 11/2004 | Sakai et al. |
| 2005/0017888 A1 | | 1/2005 | Sherwood et al. |
| 2006/0011963 A1 | | 1/2006 | Poplett |
| 2006/0023400 A1 | | 2/2006 | Sherwood |

FOREIGN PATENT DOCUMENTS

| | | |
|---|---|---|
| JP | 59-083772 | 5/1984 |
| WO | WO-00/19470 | 4/2000 |

OTHER PUBLICATIONS

"U.S. Appl. No. 11/124,706, Response filed Sep. 27, 2007 to Non-Final Office Action mailed Jun. 27, 2007", 10 pgs.

"U.S. Appl. No. 11/124,706, Notice of Allowance mailed Nov. 9, 2007", NOAR, 7 pgs.

* cited by examiner

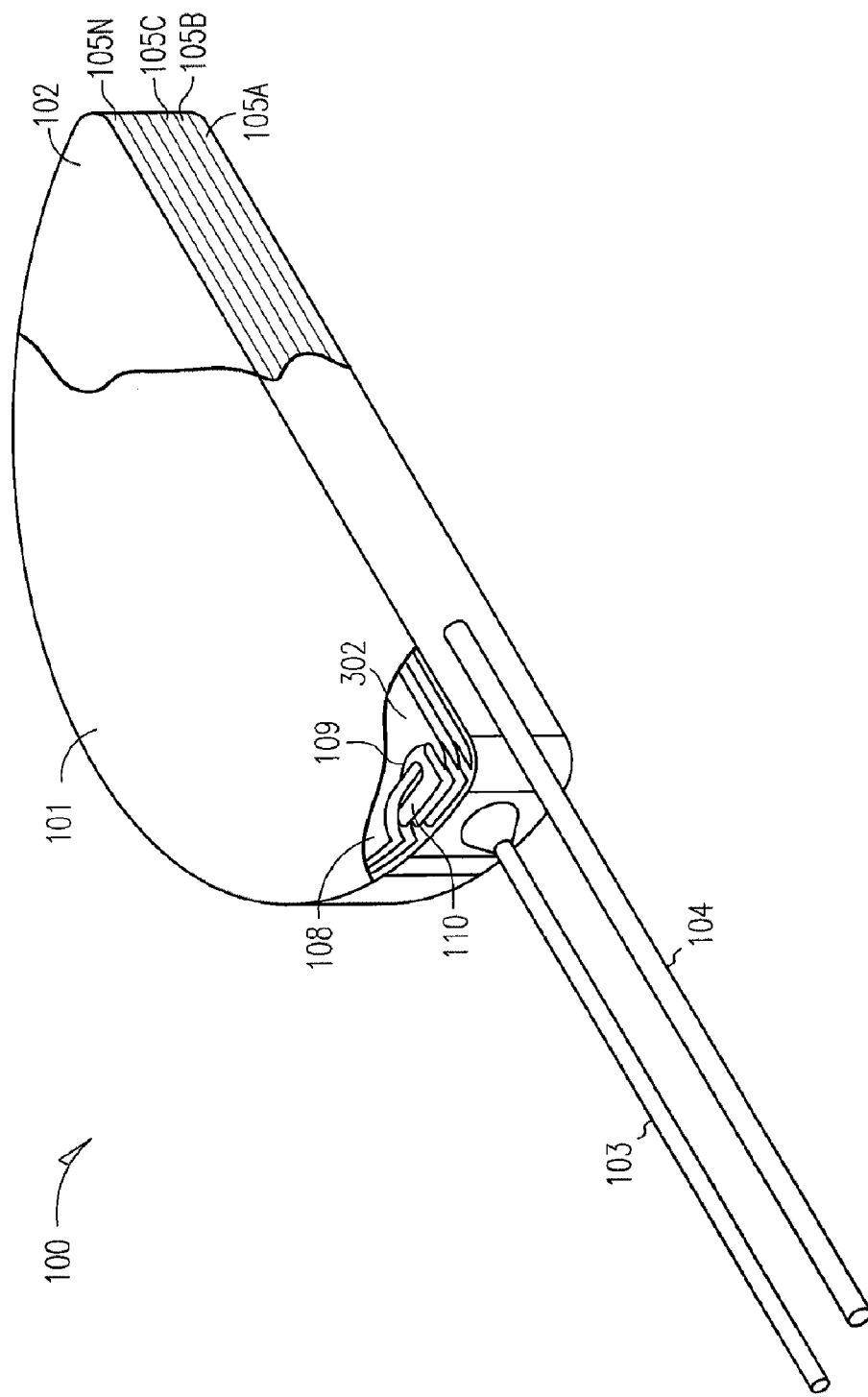

METHOD AND APPARATUS FOR INTERCONNECTING ELECTRODES WITH PARTIAL TITANIUM COATING

CROSS REFERENCE TO RELATED APPLICATIONS

The present application is a divisional application of U.S. Patent Application Ser. No. 11/124,706, filed May 9, 2005, now issued as U.S. Pat. No. 7,352,560, which is incorporated herein by reference in its entirety.

The present application is related to the following commonly assigned U.S. Patents which are incorporated by reference in their entirety: "High-Energy Capacitors for Implantable Defibrillators," U.S. Pat. No. 6,556,863, filed Oct. 2, 1998, issued Apr. 29, 2003; "Flat Capacitor Having Staked Foils and Edge-Connected Connection Members," U.S. Pat. No. 6,687,118, filed Nov. 3, 2000, issued Feb. 3, 2004; and "Flat Capacitor for an Implantable Medical Device," U.S. Pat. No. 6,699,265, filed Nov. 3, 2000, issued Mar. 2, 2004. Additionally, the present application is related to the following Provisional U.S. Patent Application which is assigned to the same assignee and is incorporated by reference in its entirety: "Method and Apparatus for Single High Voltage Aluminum Capacitor Design," Ser. No. 60/588,905, filed on Jul. 16, 2004.

TECHNICAL FIELD

This disclosure relates generally to capacitors, and more particularly, to a method and apparatus for interconnecting electrodes with partial titanium coating.

BACKGROUND

There is an ever-increasing interest in making electronic devices physically smaller. Consequently, electrical components become more compact as technologies are improved. However, such advances in technology also bring about additional problems. One such problem involves interconnects between various components and interconnects within components.

Interconnects are especially problematic with devices incorporating multiple layers. One such component is the capacitor. Capacitors provide improved charge storage and energy density using multiple conductive layers and advanced dielectrics. As the layers become more complex and smaller in dimension, problems arise with interconnections.

Thus, there is a need in the art for improved systems for interconnects between layered devices. Such systems should be readily adapted for manufacturing. The resulting interconnects should offer robust connections without damaging the multiple layers and without sacrificing substantial performance of the component.

SUMMARY

The above-mentioned problems and others not expressly discussed herein are addressed by the present subject matter and will be understood by reading and studying this specification.

The present subject matter includes, but is not limited to, embodiments of a capacitor stack having a plurality of anode layers, and at least a first cathode layer having a first metal substrate partially coated in a titanium coating and at least a second cathode layer having a second metal substrate partially coated in a titanium coating. In various embodiments, the first cathode layer has a first edge portion with the titanium coating substantially absent, and the second cathode layer has a second edge portion with the titanium coating substantially absent, the first edge portion and the second edge portion for electrical connection of the first cathode layer to the second cathode layer and wherein the first edge portion and the second edge portion are in alignment defining a cathode connection surface, the cathode connection surface connected to a conductive interconnect.

Another embodiment of the present subject matter includes a capacitor stack having at least a first substantially planar electrode and at least a second substantially planar electrode, wherein the capacitor stack is made by the process comprising: covering a first metal substrate at least partially in titanium, such that the titanium coats an edge portion of the first metal substrate; applying a titanium etchant to the first cathode layer such that the etchant removes titanium from the edge portion such that titanium is substantially absent from the edge portion; and electrically connecting the first substantially planar electrode at the etched edge portion to the second substantially planar electrode.

An embodiment of the present subject matter includes etching a plurality of anode layers with an anode etchant, growing an oxide on the plurality of anode layers, coating at least a first cathode and a second cathode in a titanium coating, and etching a portion of the first cathode and the second cathode with a titanium etchant, with the etched portion of the first cathode defining a first etched cathode edge, and the etched portion of the second cathode defining a second cathode edge. This embodiment includes stacking the first cathode, the second cathode, and the plurality of anode layers into a capacitor stack, with a first etched cathode edge and the second cathode edge in alignment and defining a cathode connection surface for connection of the first cathode and the second cathode. The embodiment also includes forming a weld on the cathode connection surface, the weld substantially free of titanium.

Another embodiment includes a capacitor stack having plurality of anode layers, and a plurality of cathode layers, with each cathode layer having a metal substrate partially coated in a titanium coating and a cathode connection means for connecting the plurality of cathode layers; and interconnect means for connecting the plurality of cathode layers; wherein the cathode connection means are in alignment defining a cathode connection surface for connection of the plurality of cathode layers, and the interconnect means connects the plurality of cathode layers along the cathode connection surface.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their legal equivalents.

BRIEF DESCRIPTION OF THE DRAWINGS

FIG. 1A is an isometric view of a flat capacitor according to one embodiment of the present subject matter.

DETAILED DESCRIPTION

Figure 1B:
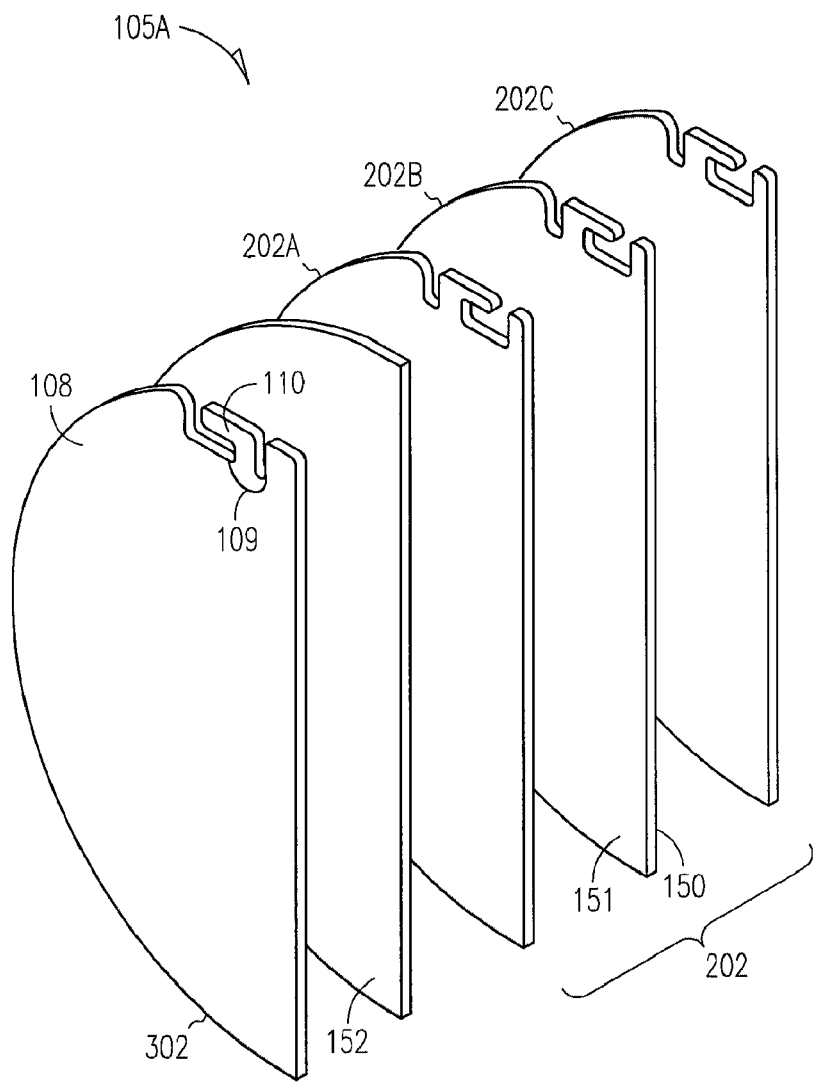
FIG. 1B is an isometric view of capacitor electrodes, according to one embodiment of the present subject matter.

The following detailed description of the present invention refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references may contemplate more than one embodiment. The following detailed description is, therefore, not to be taken in a limiting sense, and the scope is defined only by the appended claims, along with the full scope of legal equivalents to which such claims are entitled.

FIG. 1A shows a flat capacitor 100 constructed according to one embodiment of the present subject matter. Although capacitor 100 is a D-shaped capacitor, in various embodiments, the capacitor is another desirable shape, including, but not limited to, rectangular, circular, oval or other symmetrical or asymmetrical shapes. Capacitor 100 includes a case 101 which contains a capacitor stack 102. In the example embodiment, case 101 is manufactured from a conductive material, such as aluminum. In various embodiments, the case is manufactured using a nonconductive material, such as a ceramic or a plastic.

Capacitor 100 includes a first terminal 103 and a second terminal 104 for connecting capacitor stack 102 to an outside electrical component, such as heart monitor circuitry, including defibrillator, cardioverter, and pacemaker circuitry. In one example, terminal 103 is a feedthrough terminal insulated from case 101, while terminal 104 is directly connected to case 101. In various embodiments, the capacitor incorporates additional connection structures and methods. Some embodiments include two or more feedthrough terminals. The present techniques include, but are not limited to, additional techniques described on or around pages 12-13, 59-60, 63-82 of related and commonly assigned Provisional U.S. Patent Application "Method and Apparatus for Single High Voltage Aluminum Capacitor Design," Ser. No. 60/588,905, filed on Jul. 16, 2004, incorporated herein by reference.

Capacitor stack 102 includes capacitor elements 105A, 105B, 105C, . . . , 105N, with each capacitor element 105A-105N including substantially planar electrodes. Substantially planar electrode variants include one or more cathodes, anodes, and separators. In various embodiments, each cathode is a foil structure. Each cathode subcomponent of capacitor stack 102 is connected to another cathode subcomponent, in various embodiments, using a variety of methods and structures, including welding and additional connection methods discussed herein. In some embodiments, the cathode is coupled to conductive case 101, and terminal 104 is attached to case 101 to provide a cathode connection to outside circuitry. In some embodiments, the cathode is coupled to a feedthrough conductor extending through a feedthrough hole.

Pictured in the example embodiment through a partial cut-away view is a cathode subcomponent 302 with a titanium coating section 108, and a section from which titanium coating is substantially absent 110. In various embodiments, these regions are separated by a titanium coating gradient 109. The substantial absence of titanium helps interconnection, as is discussed herein.

In various embodiments, a separator is located between each anode and cathode. In one embodiment, the separator includes one or more sheets of kraft paper impregnated with an electrolyte. In one embodiment, the separator includes two sheets of paper. Various example electrolytes are discussed herein.

In one embodiment, one or more anodic subcomponents of capacitor stack 102 are configured into an element which includes three substantially planar electrodes. In various embodiments, an element includes one, two, three or more anode subcomponents having a variety of anode shapes. In various embodiments, anode subcomponents are generally foil structures and can include aluminum, tantalum, hafnium, niobium, titanium, zirconium, and combinations of these metals. In one embodiment, at least portions of a major surface of each anode is roughened and/or etched to increase its effective surface area. This increases the capacitive effect of the foil, in various embodiments, with no relative increase in volume. Various embodiments incorporate other compositions and/or classes of compositions.

In one embodiment, each anode subcomponent is connected to the other anode subcomponents of the capacitor and coupled to feedthrough assembly 103 for electrically connecting the anode to circuitry outside the case. In some embodiments, the anode is connected to the case and the cathodes are coupled to a feedthrough assembly. In various embodiments, both the anode and the cathode are connected to components through feedthroughs.

Various embodiments include a capacitor stack adapted to deliver between 7.0 Joules/cubic centimeter and 8.5 Joules/cubic centimeter. Some embodiments are adapted to deliver about 7.7 Joules/cubic centimeter. In some embodiments, the anode has a capacitance of between approximately 0.70 and 0.85 microfarads per square centimeter when charged at approximately 550 volts. In various embodiments, these ranges are available at a voltage of between about 410 volts to about 610 volts.

In various embodiments, the stack is disposed in a case, and linked with other components, a state which affects some of these values. For example, in one packaged embodiment, including a case and terminals, the energy density available ranges from about 5.3 Joules per cubic centimeter of capacitor stack volume to about 6.3 Joules per cubic centimeter of capacitor stack volume. Some embodiments are adapted to deliver about 5.8 Joules. In various embodiments, these ranges are available at a voltage of between about 410 volts to about 610 volts.

FIG. 1B shows details of one example of capacitor element 105A, which is representative of capacitor elements 105B-105N. Element 105A includes a first substantially planar substantially planar cathode 302, a first substantially planar separator 152, and a first substantially planar anode stack 202. In various embodiments, other numbers and arrangements of anodes, cathodes, and separators are utilized. The present subject matter includes, but is not limited to, additional teachings disclosed on or around pages 13-29 of related and commonly assigned Provisional U.S. Patent Application "Method and Apparatus for Single High Voltage Aluminum Capacitor Design," Ser. No. 60/588,905, filed on Jul. 16, 2004, incorporated herein by reference.

For explanation, number flags of the present illustration match the example illustrated in FIG. 1A, but this relationship should not be read as limiting. In various embodiments, cathode 302 is a substantially planar electrode attached to other cathode subcomponents of capacitor stack 102 and to terminal 104. In some embodiments, substantially planar cathode 302 can include aluminum, tantalum, hafnium, niobium, titanium, zirconium, and combinations of these metals. In one embodiment, substantially planar cathode 302 is constructed by taking an aluminum (98% purity or higher) base metal and coating it with titanium oxide, titanium nitride, or titanium pentoxide using sputtering, plating, vacuum deposition, or other coating techniques. In some embodiments, titanium itself is used with a subsequent processing step used to oxidize the titanium resulting in $TiO$, $TiO_2$, $TiN$, $Ti_2O_5$, or other high dielectric constant oxide.

Substantially planar cathode 302, in examples where the cathode comprises a titanium coated aluminum substrate, has portions with the cathode coating substantially absent. In some embodiments, the coating was never added. In additional embodiments, the coating is substantially absent. For example, the pictured example includes a portion of cathode substrate with a titanium coating 108, and a portion without a titanium coating 110, the two areas separated by a titanium coating gradient 109.

Titanium coated cathode material has a higher capacitance per unit area than traditional aluminum electrolytic capacitor cathodes. Traditional cathodes which are 98% aluminum purity or higher generally have capacitance per unit area of approximately 250 $uF/cm^2$ for 30 micron thick foil, with an oxide breakdown voltage in the 1-3 volt range. However, a cathode as described above results in a capacitance per unit area which, in some embodiments, is as high as 1000 $uF/cm^2$ or more.

Advantageously, this provides a single cathode which services several layers of anodic foil without exceeding the oxide breakdown voltage. When using a traditional cathode to service several layers (2 or more) of anodic foil, the cathode voltage may rise as high as 5 or more volts, which is usually greater than the breakdown voltage. When this occurs, the aluminum cathode begins to form oxide by a hydration process which extracts oxygen from the water present in the electrolyte. The reaction produces hydrogen as a byproduct which in turn has the effect of creating an internal pressure within the capacitor causing an undesirable mechanical bulge in the layers from the capacitor stack, or in the case. Therefore, the titanium-coated cathode described above serves as a corrective mechanism for hydrogen generation. It should be noted that in additional embodiments, an anode comprised of one or more anode subcomponents has a titanium coating. Also, in some embodiments, the anode titanium coating is substantially absent at portions of the anode.

Separator 152 is located between each anode stack 202 and substantially planar cathode 302. In one embodiment, separator 152 consists of two sheets of 0.0005 inches thick kraft paper impregnated with an electrolyte. In some embodiments, separator 152 includes a single sheet or three or more sheets. The electrolyte can be any suitable electrolyte for an electrolytic capacitor, such as an ethylene-glycol base combined with polyphosphates, ammonium pentaborate, and/or an adipic acid solute.

In one embodiment, each anode stack 202 is a multi-anode stack including three anode subcomponents 202A, 202B, and 202C. In various embodiments, anode stack 202 includes one, two, three or more substantially planar anodic subcomponents having a variety of anode shapes. Each substantially planar anode subcomponent has a major surface 151 and an edge face 150 generally perpendicular to major surface 151. Areas proximal an edge face 150 comprise an edge portion. Anode subcomponents 202A, 202B, and 202C are generally foil structures and can include aluminum, tantalum, hafnium, niobium, titanium, zirconium, and combinations of these metals.

In one embodiment, anode subcomponents 202A-202C are high formation voltage anodes, which will be discussed below. In various embodiments, the anodes are medium and/or low formation voltage foils. In one embodiment, the major surface of each substantially planar anode 202A 202C is roughened or etched to increase its microscopic surface area. This increases the microscopic surface area of the foil with no increase in volume. Various embodiments use tunnel-etched, core-etched, and/or perforated-core-etched foil structures. Various embodiments utilize other foil compositions and classes of foil compositions.

Depending on which process is used to construct the anode, various surfaces are coated with a dielectric. For example, in embodiments where the anode shapes are punched from a larger sheet which has previously been coated with dielectric, only the surfaces which have not been sheared in the punching process are coated with dielectric. But if the dielectric is formed after punching, in various embodiments, all surfaces are coated. In some embodiments, anodes are punched from a larger sheet to minimize handling defects due to handling during the manufacturing process. For example, if a larger sheet is used as a starting material from which a number of anode layers are punched, machines or operators can grasp areas of the starting material which is not intended to form the final anode. Generally, in embodiments where the entire anode is not covered with dielectric, the anode is aged to restore the dielectric.

Figure 2A:
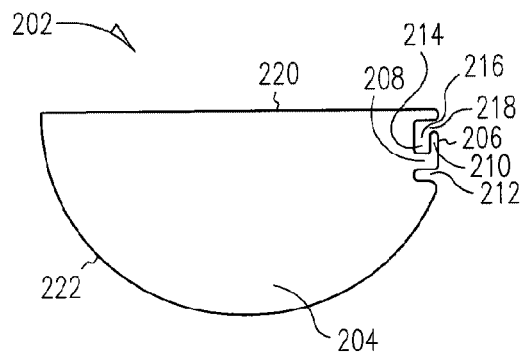
FIG. 2A is a top view of an anode foil for use in constructing a capacitor according to one embodiment of the present subject matter.

FIG. 2A shows a substantially planar anode 202 according to one embodiment of the present subject matter. Substantially planar anode 202 is shown before it is assembled into capacitor stack 102 as shown in FIG. 1. Substantially planar anode 202 includes a main body portion 204 having one or more connection members 206. In one embodiment, connection member 206 includes one or more separate members attached to the anode by welding, staking, or other connection method.

In various embodiments, connection member 206 is an integral portion of substantially planar anode 202, and is punched, laser-cut, or otherwise shaped from the anode foil. In such an embodiment, portions of connection member 206 are not etched along with the rest of substantially planar anode 202. For instance, a chemical mask is put on portions of connection member 206 to keep those masked portions from becoming etched during the etching process. As will be discussed below, unetched portions provide for improved welding. Various embodiments includes, but is not limited to, subject matter disclosed on or around pages 102-106, 115-119 of related and commonly assigned Provisional U.S. Patent Application "Method and Apparatus for Single High Voltage Aluminum Capacitor Design," Ser. No. 60/588,905, filed on Jul. 16, 2004, incorporated herein by reference.

Connection member 206 includes a proximal section 208 and distal section 210. In the embodiment of FIG. 2A, connection member 206 is an L-shaped member. However, it can have other shapes, such as shapes extending away from an electrode orthogonally. In one embodiment, a portion of a distal section 210 along its outer edge is unetched. For example, an unetched edge results from punching.

In one embodiment, proximal section 208 is connected to main body 204 and is defined in part by a pair of cut-out portions 212 and 214 located on opposing sides of proximal section 208. Distal section 210 is connected to a portion of proximal section 208. In one embodiment, it is integral with proximal section 208. In some embodiments, distal section 210 is attached as a separate member. In one embodiment, distal section 210 is defined in part by a cut-out portion 216 which is located between main body 204 and distal section 210, and a cut-out portion 218 which separates distal section 210 from main body 204.

In this embodiment, connection member 206 is located within the general perimeter or outline of substantially planar anode 202. In various embodiments, a connection member extends further from the main body of substantially planar anode 202 or connection member 206 is more internal within the main body of substantially planar anode 202.

In some embodiments, each anode foil in capacitor stack 102 includes a connection member such as connection member 206. In various embodiments, one or more anode foils in a multi-anode stack have a connection member 206 while the other anode foils in the multi-anode stack are connected to the anode having the connection member. For instance, in one embodiment, a three-foil anode stack includes one foil having a connection member 206 and two foils without connection members. The two foils without connection members are welded, staked, or otherwise attached to the foil having the connection member.

Figure 2B:
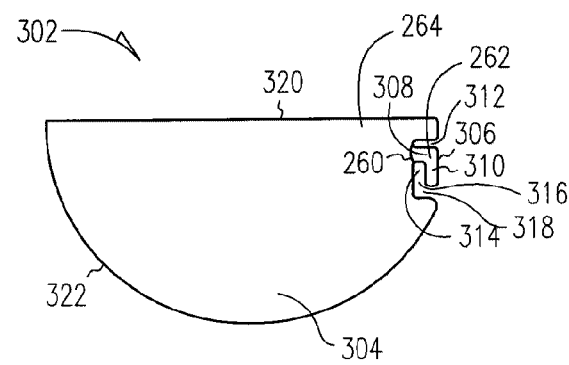
FIG. 2B is a top view of a cathode foil for use in constructing a capacitor according to one embodiment of the present subject matter.

FIG. 2B shows a substantially planar cathode 302 according to one embodiment of the present subject matter. Substantially planar cathode 302 is shown before it is assembled into capacitor stack 102 as shown in FIG. 1. Substantially planar cathode 302 includes a main body portion 304 having one or more connection members 306. In one embodiment, connection member 306 is an integral portion of substantially planar cathode 302, and is punched, laser-cut, or otherwise shaped from the anode foil. In one embodiment, connection member 306 includes one or more separate members attached to the cathode by welding, staking, or other connection method. The present teachings include, but are not limited to, the teachings on or around pages 16-29 of related and commonly assigned Provisional U.S. Patent Application "Method and Apparatus for Single High Voltage Aluminum Capacitor Design," Ser. No. 60/588,905, filed on Jul. 16, 2004, incorporated herein by reference.

In various embodiments, portions of connection member 306 are not coated in a titanium coating. For example, various embodiments include a titanium covered portion 264, a portion with titanium substantially absent 262, and a gradient 260 separating the two areas. For instance, in one embodiment, a titanium etchant is applied to portions of connection member 306 to substantially remove titanium coating from those portions. As discussed elsewhere in this application, this can provide for improved welding. For example, in some embodiments, the cathode connection member 306 is first welded to one or more anode connection members 206, and is then cut away from the respective main cathodic body 304. As such, in use there are portions of cut-away cathode connected to an anode.

Welding performed to anodes can damage dielectric boundaries, requiring post-welding aging. In instances where portions of at least one cut-away cathode is attached to the anode, it is beneficial to avoid weld compositions including titanium. Titanium in the weld can reduce the effectiveness of oxide growth during aging. By limiting the amount of titanium in the weld, the effectiveness of aging is improved, which can result in improved capacitor performance. Thus, portions of cut-away cathode with titanium substantially absent from welding areas benefit capacitor performance during aging and overall.

In one embodiment, connection member 306 includes a proximal section 308 and a distal section 310. In the embodiment of FIG. 2B, connection member 306 is an L-shaped member. However, additional embodiments include other shapes. Some embodiments include shapes which do not bend.

In one embodiment, proximal section 308 is connected to main body 304 and is defined in part by a pair of cut-out portions 312 and 314 located on opposing sides of proximal section 308. Distal section 310 is connected to a portion of proximal section 308. In one embodiment, it is integral with proximal section 308. In some embodiments, distal section 310 is attached as a separate member. In one embodiment, distal section 310 is defined in part by a cut-out portion 316 which is located between main body 304 and distal section 310, and a cut-out portion 318 which separates distal section 310 from main body 304.

In this embodiment, connection member 306 is located within the general perimeter or outline of substantially planar cathode 302. In various embodiments, connection member 306 extends further from the main body of substantially planar cathode 302 or connection member 306 is more internal within the main body of substantially planar cathode 302.

Figure 3A:
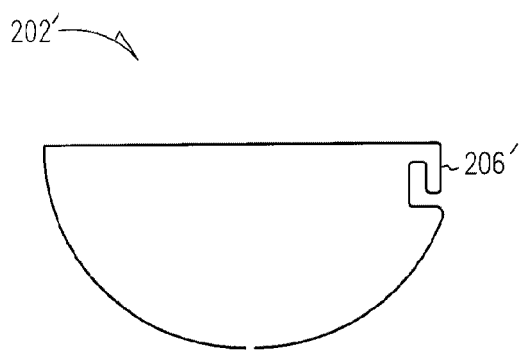
FIG. 3A is a top view of an anode foil for use in constructing a capacitor according to one embodiment of the present subject matter.
Figure 3B:
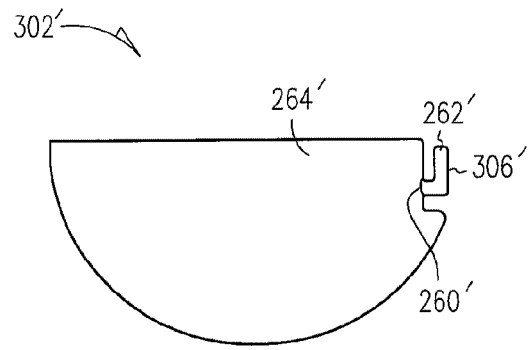
FIG. 3B is a top view of a cathode foil for use in constructing a capacitor according to one embodiment of the present subject matter.

FIGS. 3A and 3B show a substantially planar anode 202' and a substantially planar cathode 302' according to one embodiment of the present subject matter. Substantially planar anode 202' and substantially planar cathode 302' are shown before being assembled into capacitor stack 102 as shown in FIG. 1. Substantially planar anode 202' and substantially planar cathode 302' are generally similar to substantially planar anode 202 and substantially planar cathode 302, respectively, except connection member 206' does not include a cut-out such as cut-out 212 of substantially planar anode 202 and connection member 306' does not include a cut-out such as cut-out 318 of substantially planar cathode 302. Various embodiments utilize other shapes and locations for connection members such as connection members 206, 206', 306, and 306'. Various embodiments include a titanium covered cathode portion 264', a cathode portion with titanium substantially absent 262', and a gradient 260' separating the two areas.

For instance, in various embodiments, connection members 206 and 306 may be in different positions along the edges or even within the main body portions of the capacitor foils 202 and 302. In some embodiments, connection members 206 and 306 are located along edges 220 and 320 of the respective foils 202 and 302. Portions are located along curved edges 222 and 322 of the respective foils 202 and 302, in additional embodiments. In various embodiments, the portions may be cut-out within main bodies 204 and 304.

In one embodiment, proximal section 308 of substantially planar cathode 302, and proximal section 208, of substantially planar anode 202 overlap, while distal sections 210 and 310 do not. In additional embodiments, other shapes and configurations are used. These additional embodiments include embodiments having various ratios of anode connection member length to cathode connection member length. These embodiments also include configurations where an anode connection member has a general shape which is different than a cathode connection member.

Figure 4:
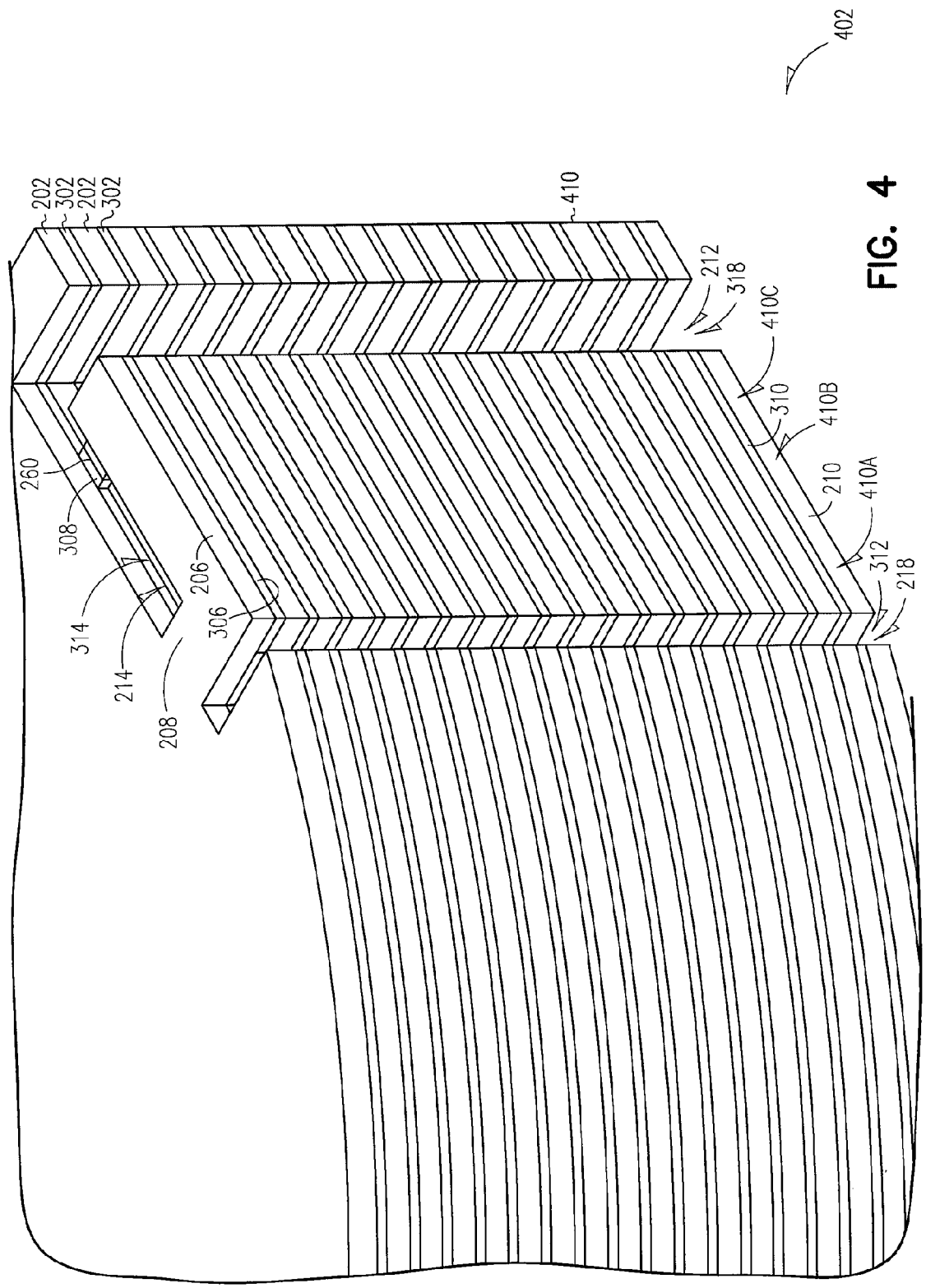
FIG. 4 is a perspective view of a cut-away of a stack of one or more anodes and cathodes of FIGS. 2A and 2B.

FIG. 4 shows a stack 402 of one or more alternating substantially planar anodes 202 and substantially planar cathodes 302. As shown in FIG. 4, connection members 206 and 306 are overlapping each other. As used herein, overlap and underlay refer to the position or location of portions of the foils which are commonly positioned from a top view. In the embodiment of FIG. 4, it is seen that connection members 206 and 306 have some commonly positioned portions relative to each other and some portions which are exclusively positioned relative to each other.

For instance, proximal sections 208 of substantially planar anodes 202 are exclusively positioned or located. This means that at least a portion of proximal sections 208 do not overlap a portion of cathodes 302. Likewise, proximal sections 308 of substantially planar cathodes 302 are exclusive portions and include at least a portion not overlapping a portion of substantially planar anode 202. Conversely, distal sections 210 and 310 are commonly positioned and each include at least a portion overlapping each another. Cut-out portions 214 and 314 are also commonly positioned. Cut-out 218 is commonly positioned with cut-out 312 while cut-out 212 is commonly positioned with cut-out 318.

When stacked as shown in FIG. 4, the edges of distal sections 210 and 310 form a surface 410. In this embodiment, surface 410 can generally be described as having a first portion 410A which fronts the proximal sections 208 of substantially planar anodes 202, a second portion 410B which fronts common cut-portions 214 and 314, and third portion 410c which fronts the proximal sections 308 of substantially planar cathodes 302.

In this embodiment, distal sections 210 and 310 of anode connection member 206 and cathode connection member 306 are fully overlapping one another. Fully overlapping means that there are generally no gaps along surface 410 of stack 402 when the anodes and cathodes are stacked as in FIG. 4. The fully overlaid structure of stack 402 provides a complete surface 410 which provides for ease of edge-welding or otherwise connecting connection members 206 and 306 together, as will be described below. As will be discussed below, various embodiments leave one or more gaps in surface 410 when the anodes and cathodes are stacked. For instance, in some embodiments, one or more of distal sections 210 or 310 may not reach all the way across front surface 410.

After being stacked as discussed above, at least portions of connection members 206 and 306 are connected to each other.

For instance, in one embodiment portions of distal sections 210 and 310 are connected to each other. In one embodiment, distal sections 210 and 310 are edge-welded along surface 410. In one embodiment, distal sections 210 and 310 are only connected along portion 410A and 410C of surface 410. In one embodiment, distal sections 210 and 310 are soldered along surface 410. In some embodiments, portions of distal sections 310 and 210 are staked, swaged, laser-welded, or connected by an electrically conductive adhesive. In various embodiments, portions of proximal sections 208 are connected to each other and/or portions of proximal sections 308 are connected to each other. Additional embodiments are interconnected using an interconnection member, such as a ribbon of metal.

In various embodiments, it is useful in welding to include portions of substantially planar cathode 302 which have the titanium substantially absent from the aluminum substrate. Titanium, when present in a weld, can affect the performance of aging processes applied to the weld. In other words, the formation of an oxide on a weld connecting multiple electrodes is altered by the present of titanium, which can be detrimental to oxide performance in use. For example, when titanium is present in an aluminum weld, increased leakage current and increased shelf factor is measurable. This is unfavorable. By using cathodes which have portions for welding which do not have titanium, the impact of these tendencies is reduced. In various embodiments, the coating gradient 260 separates unetched portions of substantially planar cathode 302, such as the main body, from etched portions, such as the connection member 306.

After being connected, portions of connection members 206 and 306 are removed or separated so that proximal sections 208 and 308 are electrically isolated from each other. As used herein, electrically isolated means that sections 208 and 308 are electrically insulated from each other at least up to a surge voltage of capacitor 100.

Figure 5:
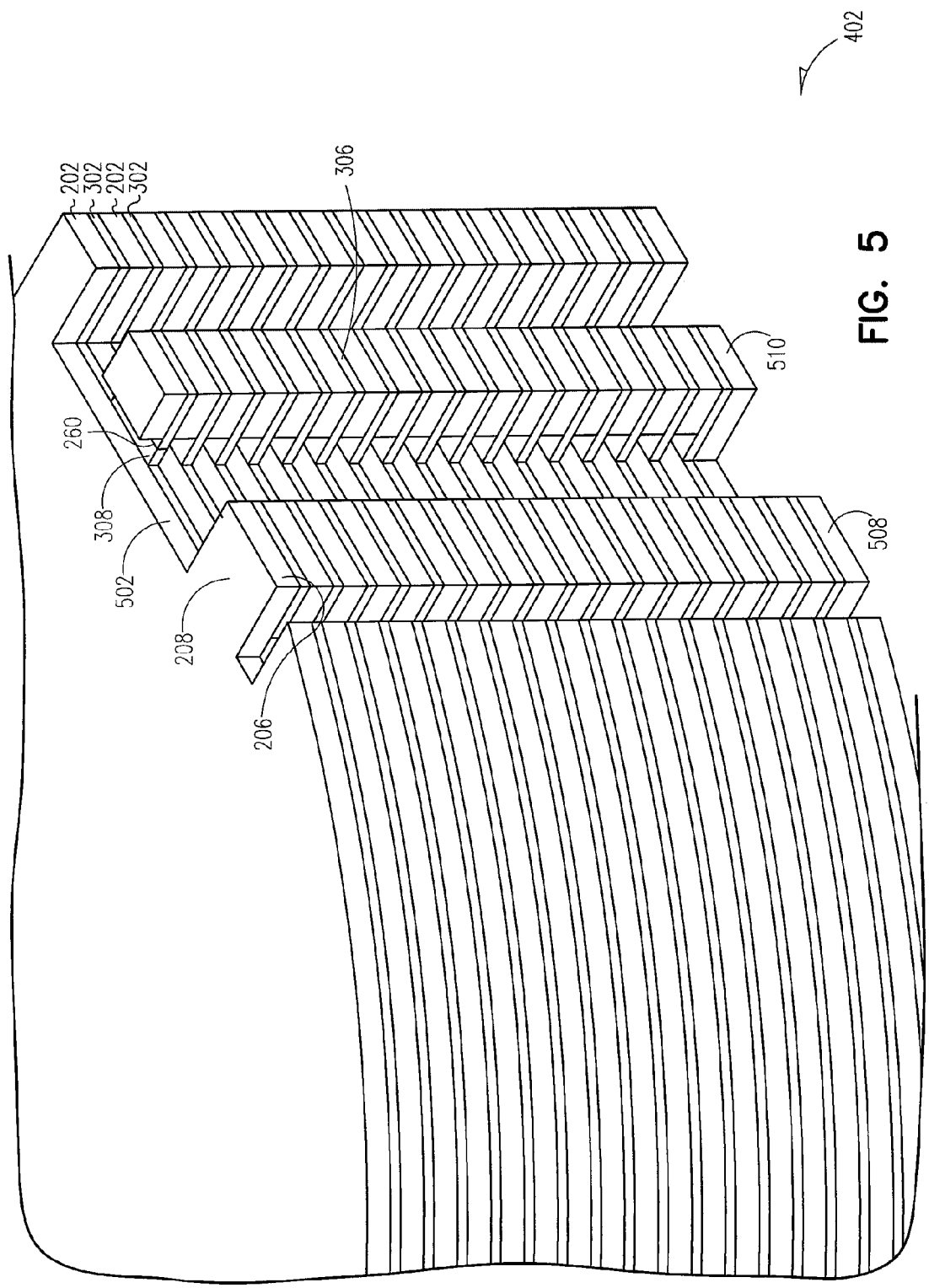
FIG. 5 is a perspective view of the stack of FIG. 4 after the stack has been processed according to one embodiment of the present subject matter.

FIG. 5 shows stack 402 after portions of distal sections 210 and 310 have been removed from the stack, forming a separation 502 between anode connection members 206, which together comprise anode connection section 508, and cathode connection members 306, which together comprise cathode connection section or surface 510. Separation 502 in the present embodiment electrically isolates section 508 from section 510. In various embodiments, the coating gradient 260 separates unetched portions of substantially planar cathode 302, such as the main body, from etched portions, such as the connection member 306. Portions of cathodes remaining on anode connection section or surface 508 have the titanium substantially absent from the aluminum substrate, enabling a weld which is substantially free of titanium. Welds which are substantially free of titanium develop improved oxides, which decreases leakage current in various examples.

Proximal sections 308 are still electrically coupled to each other as are proximal sections 208. In some embodiments, separation 502 is a thin slice. In some embodiments, separation 502 is as wide as cut-outs 214 and 314, as shown in FIG. 4. In some embodiments, an electrically insulative material is inserted in separation 502. In various embodiments, separation 502 is formed by laser cutting, punching, and/or tool or machine cutting.

One benefit of stacking anodes and cathodes as such as that the formation of anode connection surface 508 does not require excessive bending of anodes. For example, if portions of cathodes did not separate anodes, the anodes would require compressive forces approximately perpendicular to the major plane of the anodes to deform the anodes into forming an anode connection surface. By allowing cathode portions which are electrically isolated from the cathode of the capacitor to occupy the spaces between anode layers, the need for these compressive forces is reduced, resulting in less bending stress on anodes, which can reduce instances of anode breakage.

Figure 6:
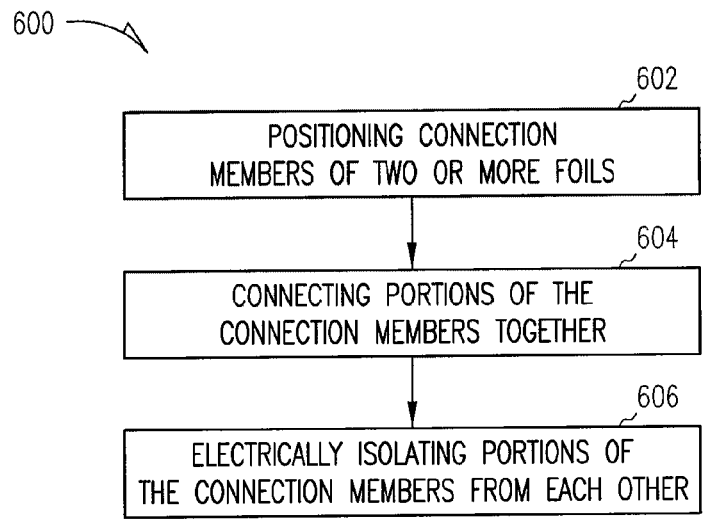
FIG. 6 is a block diagram illustrating a method of interconnecting anodes and cathodes of a capacitor according to one embodiment of the present subject matter.

FIG. 6 shows a flowchart depicting a method 600 for interconnecting two or more foils of a capacitor according to one embodiment of the present subject matter. Method 600 includes a block 602, positioning the connection members of two or more foils, a block 604, connecting the connection members, and block 606, electrically isolating portions of the connection members from each other.

In one embodiment, block 602, positioning the connection members of two or more foils, includes stacking an anode foil having a connection member having a proximal section and a distal section upon a cathode foil having a connection member having a proximal section and a distal section. The foils and connection members are positioned so that the proximal section of the anode foil connection member does overlap the proximal section of the cathode foil connection member. In some embodiments, the distal section of the anode foil connection member at least partially overlaps the distal section of the cathode foil connection member.

In one embodiment, block 604, connecting the connection members, includes connecting the connection member of the anode foil to the connection member of the cathode foil. In one embodiment, this includes connecting the distal section of the anode connection member and the distal section of the cathode connection member at a portion of the anode connection member that overlaps the portion of the cathode connection member. In one embodiment, connecting comprises a single, continuous connection process. For instance, a laser weld or staking process is performed which attaches all the anode and cathode foil connection members together. In various embodiments, this occurs during a single, uninterrupted process. In one embodiment, the connection is performed by edge-welding at least a portion of the distal sections of the anode foil and the cathode foil together. One embodiment includes a laser edge-welding process. Alternatively, in some embodiments, a portion of the stack is welded during a different process or by a different method than the first process. Some embodiments include soldering, staking, swaging, and/or applying an electrically conductive adhesive. Additionally, the present techniques include, but are not limited to, the teachings discussed in "Flat Capacitor Having Staked Foils and Edge-Connected Connection Members," U.S. Pat. No. 6,687,118, filed on Nov. 3, 2000, which is incorporated here by reference.

In embodiments where the cathode has a titanium coating, a laser welding process which connects multiple layers, such as multiple anodes and cathodes, benefits from a substantial absence of titanium. For example, the resulting weld when titanium is substantially absent from the welding area has few or no titanium "impurities." The absence of titanium encourages the weld to form with an aluminum exterior. Welds with aluminum exteriors are suited for growth of dielectrics, such as aluminum oxide.

One explanation of this phenomenon is that, in a molten phase, a weld which has at least some titanium in it tends to position the titanium at the surface of the weld. This can result in aging complications. In various embodiments, aging includes exposing the aluminum structure to a solution, the anode under power, in an attempt to grow an oxide on exposed aluminum. In one embodiment, the solution is an ethylene glycol based electrolyte suitable for the test voltage.

One reason to age a capacitor is that during production, an anode can exhibit areas not covered by dielectric. For example, edges resulting from a punching operation have exposed aluminum. To prepare the anode for final use, additional oxide is grown on the anode. Aging is one way to grow oxide. However, titanium inhibits formation of oxide during aging. Areas of weld which include titanium form oxide less desirably, which can result in a higher leakage current when the capacitor is in use.

In one embodiment, block 606, electrically isolating portions of the connection members from each other, includes removing portions of the anode connection member and the cathode connection member. In one embodiment, the removed portion includes an area where the cathode connection member overlaps a portion of the anode connection member. In one embodiment, this includes removing a portion of the distal sections of the anode connection member and a portion of the distal section of the cathode connection member. In one embodiment, electrically isolating comprises punching-out a portion of the distal section of the anode foil connection member and the distal section of the cathode connection member. In one embodiment, electrically isolating includes laser cutting a portion of the distal section of the anode connection member and a portion of the distal section of the cathode connection member.

After being processed as discussed above in block 606, proximal sections 208 of the connection members of substantially planar anodes 202 are still coupled to distal sections 310 of the substantially planar cathodes 302, and proximal sections 308 of the cathode connection members are still connected to distal portion 210 of the anode 202, while substantially planar anodes 202 and substantially planar cathodes 302 are electrically isolated from each other. Feedthroughs or other terminal members are used to couple the anodes and cathodes to outside circuitry.

Figure 7:
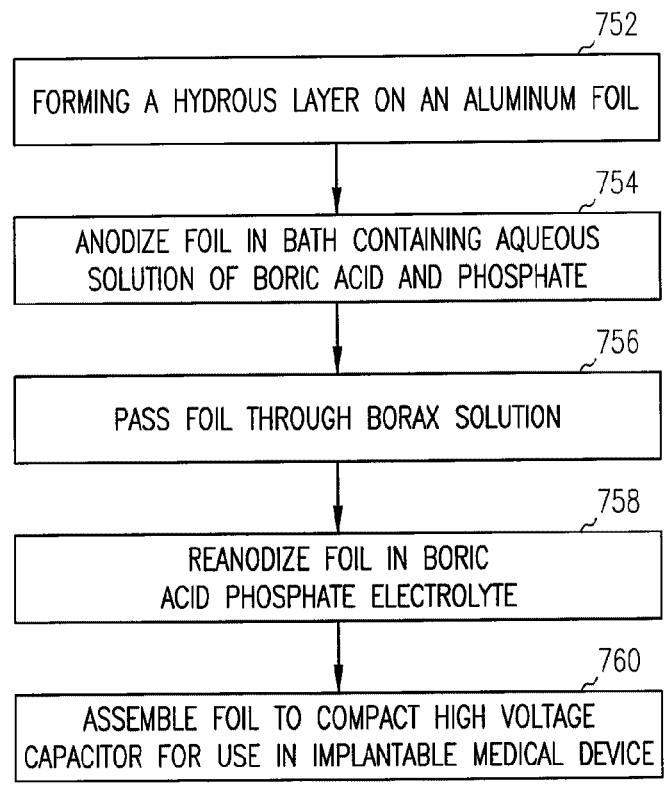
FIG. 7 illustrates a block diagram for anodization of an aluminum electrolytic capacitor foil, according to one embodiment of the present subject matter.

FIG. 7 illustrates an example process for the anodization of aluminum electrolytic capacitor foil, according to the present subject matter. In varying embodiments, the present subject matter is capable of producing anodized aluminum electrolytic capacitor foil at a formation voltage from about 200 volts to about 760 volts, which can result in a capacitor with a working voltage from about 150 volts to about 570 volts. For example, the present subject matter encompasses aluminum oxide formed at between approximately 600 volts and approximately 760 volts. Additionally, the present subject matter encompasses embodiments where anodization occurs from about 653 volts to about 720 volts. Additionally, the present subject matter encompasses embodiments wherein anodization occurs from about 667 volts to about 707 volts during formation.

Varied processes can be utilized to produce the aluminum foil of the present subject matter. For example, one process includes forming a hydrous oxide layer on an aluminum foil by immersing the foil in boiling deionized water 752. The aluminum foil is also subjected to electrochemical anodization in a bath containing an anodizing electrolyte 754 composed of an aqueous solution of boric acid, a phosphate, and a reagent. Additionally, the anodizing electrolyte contains a phosphate. In various embodiments, the anodizing electrolyte is at a pH of approximately 4.0 to approximately 6.0. In some examples, the foil is passed through a bath containing a borax solution 756. Borax, in various embodiments, includes a hydrated sodium borate, $Na_2B_4O_7.10H_2O$, and is an ore of boron.

In varying embodiments, the foil is reanodized in the boric acid-phosphate electrolyte previously discussed 758. In various embodiments of the present subject matter, the process produces a stabilized foil suitable for oxide formation of up to approximately 760 volts.

In various embodiments, the anodizing electrolyte used in block 754 and 756 contains about 10 grams per liter to about 120 grams per liter of boric acid and approximately 2 to approximately 50 parts per million phosphate, preferably as phosphoric acid, and sufficient alkaline reagent to lower the resistivity to within approximately 1500 ohm-cm to approximately 3600 ohm-cm and increase the pH from about 4.0 to about 6.0 for best anodization efficiency and foil quality.

In some embodiments, the borax bath contains 0.001 to 0.05 moles/liter of borax. Because the anodizing electrolyte is acidic, in various embodiments, the borax bath is buffered with sodium carbonate to prevent lowering of the pH by dragout of the acidic electrolyte. Additionally, in various embodiments, the borax bath is buffered to lower its resistivity. In one example, the pH of the bath is from about 8.5 to about 9.5, and the temperature is at least approximately 80 degrees Celsius. In varying embodiments, the sodium concentration is approximately 0.005M to approximately 0.05M, preferably about 0.02M. It should be noted that concentrations of less than approximately 0.005M are too dilute to control properly, and concentrations above approximately 0.05M increase the pH, resulting in a more reactive solution which degrades barrier layer oxide quality.

In varying embodiments of the present subject matter, the presence of at least approximately 2 parts per million phosphate in the acidic anodizing electrolyte is critical. For example, this presence initiates stabilization of the foil so that solely hydrous oxide dissolves in the alkaline borax bath, without damage to the barrier layer dielectric oxide. In varying embodiments, this lowers ESR (equivalent series resistance) of the anodized foil.

Additionally, in various embodiments, when the foil is reanodized following the alkaline borax bath, the foil surface is alkaline and reacts electrochemically with the phosphate, which, in various embodiments, results in the incorporation of phosphate into the dielectric oxide. In varying examples, the alkaline foil surface includes an alkaline metal aluminate, and in one embodiment includes a sodium aluminate. It should be noted that the amount of allowable phosphate in the anodizing electrolyte, in various embodiments, is inversely proportional to the voltage at which the foil is being anodized. For example, in one embodiment, using greater than approximately 24 parts per million results in failure during oxide formation at around 650 volts. In embodiments where approximately 50 parts per million of phosphate is exceeded, the electrolyte scintillates at the foil interface, resulting in damaged, unstable foil. One benefit of the present subject matter is that an electrode is produced which can tolerate a high formation voltage without scintillation at the boundary layer of the foil. It should be noted that anodization temperature should be maintained from about 85 degrees Celsius to about 95 degrees Celsius, as variance outside of these values results in a barrier layer oxide of lower quality, and foil corrosion.

Various aspects of the present subject matter include performance properties which enable the capacitor to function as a single capacitor in an implantable cardioverter defibrillator 760. For example, by constructing the capacitor stack with the methods and apparatus contained in these teachings, one may construct a capacitor which is suited for use as the sole capacitor used for powering therapeutic pulses in an implantable cardioverter defibrillator. By using a single capacitor, instead of two capacitors which are connected in series, the present subject matter contributes to weight and size reductions.

Figure 8:
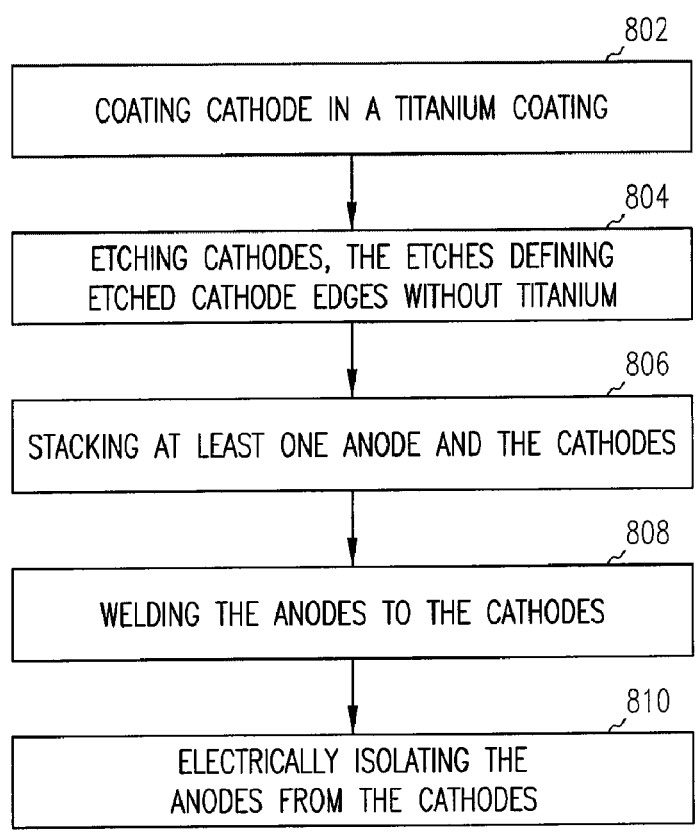
FIG. 8 illustrates a block diagram of one process for forming an anode and cathode stack, according to one embodiment of the present subject matter.

FIG. 8 illustrates a block diagram of one process for forming a capacitor stack, according to the present subject matter. In various embodiments, the present subject matter includes creating a cathode with a partial titanium coating 802. Various processes for applying titanium to a cathode are discussed herein. Also, additional processes or process steps relating to titanium coating are within the scope of the present subject matter.

A cathode partially coated in a titanium coating is formed a number of ways. For example, in some embodiments, only a portion of the aluminum substrate is subjected to a titanium coating process. In additional embodiments, the entire cathode is coated in a titanium coating, and a portion of the total titanium coating is removed. In various circumstances, a process of coating the entire cathode and then removing a portion offers more economical development of a cathode partially coated in titanium.

Various methods of removing a portion of a titanium coating include etching the coating from the titanium. Some methods etch at least two cathodes 804. In one embodiment, a titanium coating is etched away using a solution which is applied to the coating for removal of the coating. One example solution includes applying a mixture of NaOH and $H_2O_2$ to the titanium coating. For example, in one embodiment, approximately 20% NaOH is mixed with approximately 30% $H_2O_2$ at approximately a 1:1 volumetric ratio. In various embodiments, additional ratios are used, such as a ratio of approximately 1:2 of approximately 20% NaOH to approximately 30% $H_2O_2$. In various additional embodiments, an approximately 1:1 ratio of approximately 20% NaOH to approximately 30% $H_2O_2$ is heated to approximately 40 degrees Celsius.

The exposure duration of the cathode covered in a titanium coating is from about 20 second to about 30 seconds, in various embodiments of the present subject matter. In some embodiments, after exposure to the solution, the cathode is rinsed proximal the etched area. For example, in one embodiment a quench with deionized water is performed, for about 1 second to about 2 seconds. Although these values are useful for producing a cathode with a partial titanium coating, other ranges are within the scope of the present subject matter.

In various embodiments, the process replaces the solution of NaOH and $H_2O_2$ with a freshly mixed solution for every about 10 to about 15 etchings performed. The etched cathode is allowed to air dry, in some embodiments. Parameters of the etching step are varied to ensure that the process used to remove the titanium does not remove the aluminum substrate at an undesired rate. One method of verifying that the process is running normally is to perform an energy dispersive analysis by X-ray ("X-ray detection") as is known in the art. One example of the X-ray detection method produces a spectrum representative of the elemental components comprising the resultant etched cathode surface. An example chart representing a spectrum measured with an example X-ray detection process is pictured in FIG. 9C, discussed below.

Various embodiments include stacking at least one etched cathode with at least one anode. Additional processes include stacking at least two etched cathodes with at least one anode 806. In various embodiments, this is accomplished using the process taught in the discussion associated with example illustrations of FIG. 4-5, but other processes are within the scope of the present subject matter. As is described above, some embodiments of the present method include connecting anodes to cathodes 808, and then separating the anodes from the cathodes such that a portion of the cathodes are still connected to the one or more anode layers 810. One example of an embodiment illustrating this is pictured in the example illustration FIG. 5, but other embodiments are within the scope of the present subject matter. Due in part to an anode connection surface being substantially free of titanium, a weld which is better adapted for aging is formed. Improved welds help to reduce the leakage current of a capacitor in use.

Figure 9A:
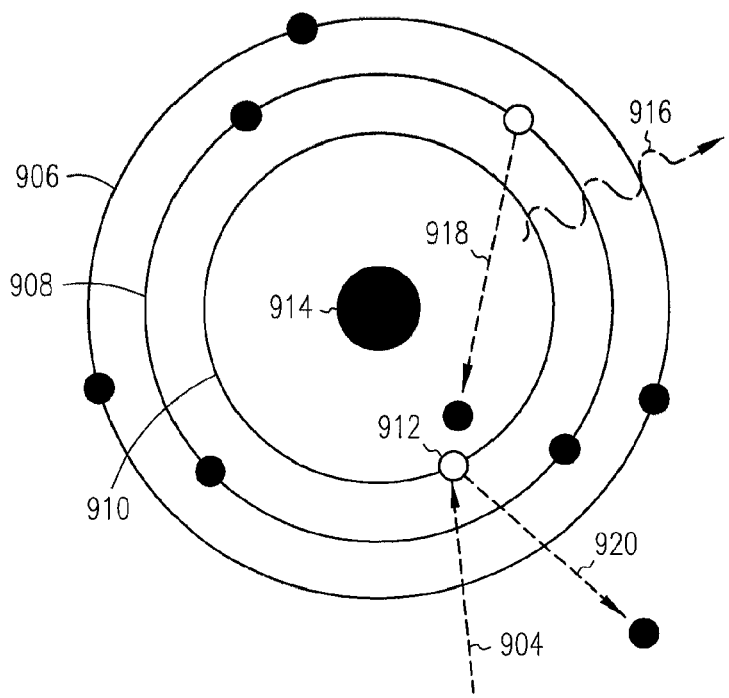
FIG. 9A illustrates a schematic of a material measured with electron beam analysis, according to one embodiment of the present subject matter.

FIG. 9A illustrates a schematic of a material measured with electron beam analysis, according to one embodiment of the present subject matter. In various embodiments, the material is comprised of atoms having multiple shells of electrons 906, 908, 910 which revolve around a nucleus 914. For discussion purposes, it is easier to focus on reactions occurring at a single atom, but it is noted that multiple atoms of the material contribute to the analysis.

In various embodiments, an atom is excited with an electron beam 904. In some of these embodiments, the incident electron beam 904 bombards the atom. Bombardment, in various embodiments, occurs when an electron in a lower energy inner shell, such as shell 910, is bombarded by an incident electron beam 904, causing the electron to be ejected 920 from its shell 910 leaving an ionized atom having a vacancy 912. In various embodiments, an electron from an outer, higher energy shell 908 will fill 918 the vacant lower energy inner shell so that the atom becomes more stable. This process is sometimes referred to as relaxing. In this electron transition process, energy is emitted in the form of X-rays 916. For example, in one embodiment, a Kα X-ray is emitted. Shell 906 is an "M shell", shell 908 is an "L shell", and shell 910 is a "K shell," and in various embodiments, these designations refer to the type of X-ray emitted, in various embodiments. An analysis of these X-rays using an X-ray detection analysis provides composition information. One type of X-ray detection analysis is an energy dispersive X-ray analysis, but other analysis may be used without departing from the scope of the present subject matter. It is noted that while this procedure is useful for determining the composition of a material, the present subject matter should not be limited to this procedure, as other procedures adapted to provide composition material fall within the scope of the present subject matter.

Figure 9B:
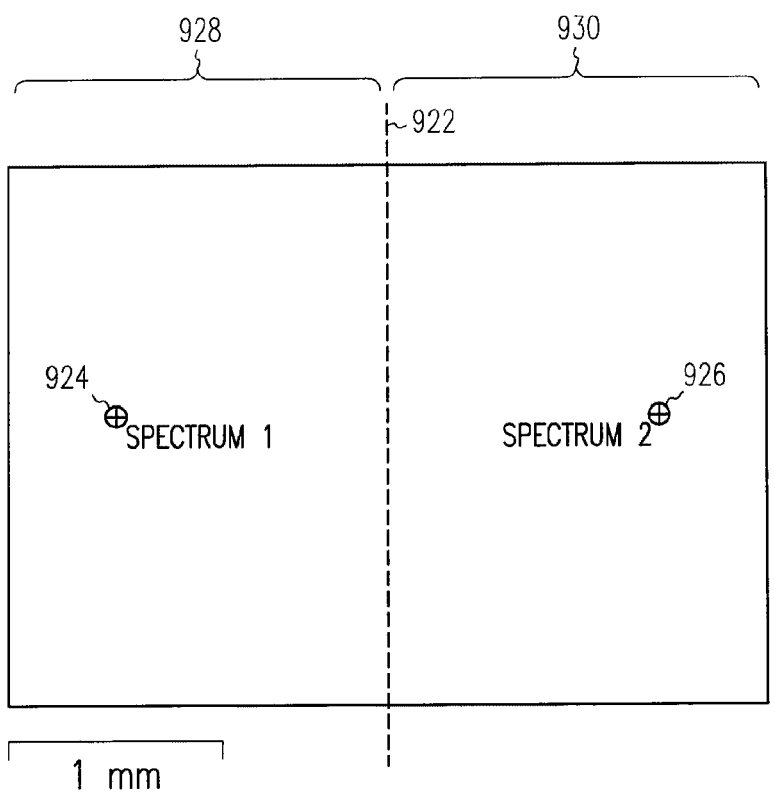
FIG. 9B illustrates a coupon for analysis, according to one embodiment of the present subject matter.

FIG. 9B illustrates a coupon for analysis, according to one embodiment of the present subject matter. The coupon includes a first portion 928, and a second portion 930. The portions are divided by a reference axis 922. The first portion includes a first analysis target 924, where an incident electron beam encounters the coupon. The second portion includes a second analysis target 926, which is where an incident electron beam encounters the second portion. The first portion, in various embodiments, represents areas of the coupon having a titanium coating. The second portion 930, in various embodiments, represents areas of the coupon in which etching has substantially removed the titanium. The coupons are not limited to the physical embodiments described in this technique, and other sizes, shapes, and system configurations adapted to enable analysis are within the scope of the present subject matter.

Figure 9C:
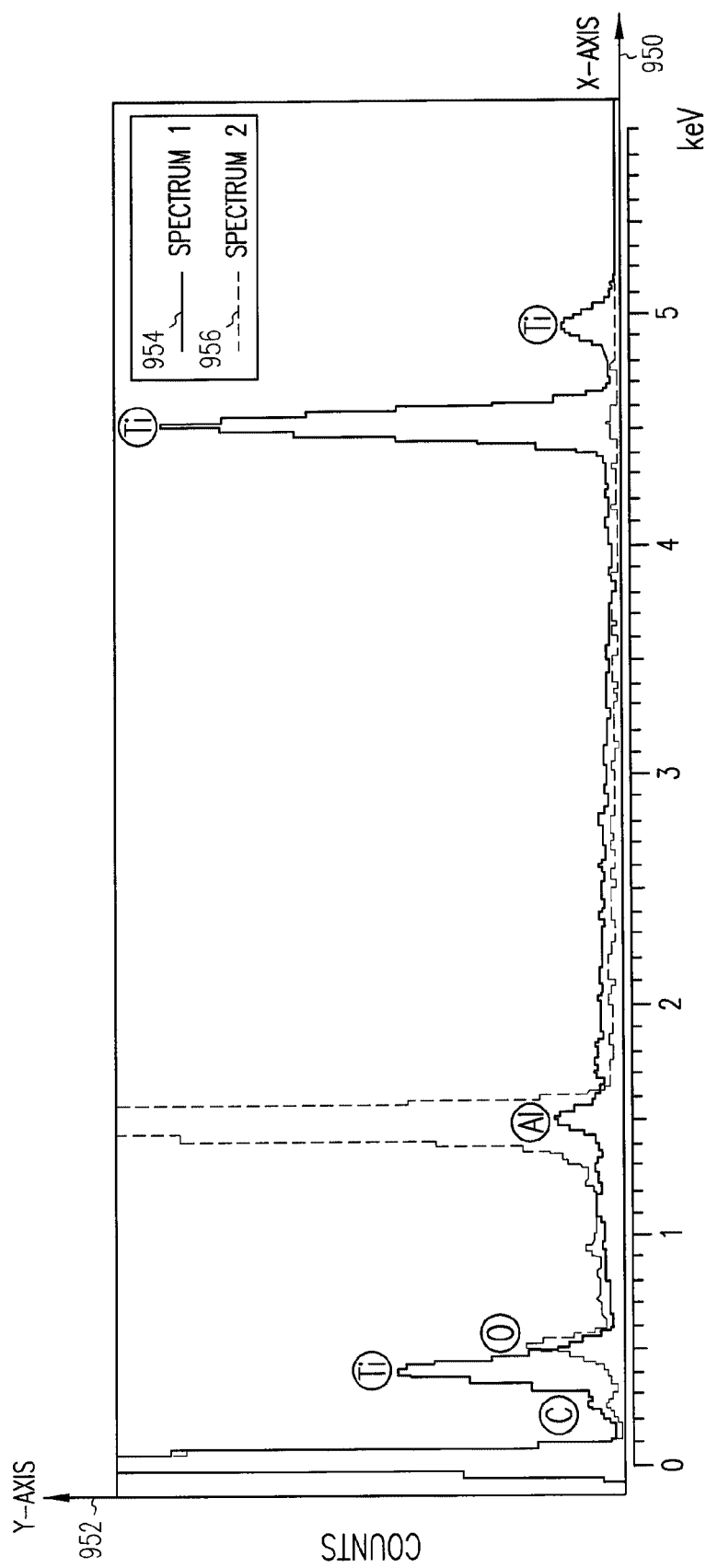
FIG. 9C illustrates a chart of an analysis, according to one embodiment of the present subject matter.

FIG. 9C illustrates a chart of analyses, according to one embodiment of the present subject matter. In various embodiments, the chart shows results of two X-ray detection analyses of a cathode of the present subject matter. The dependent x-axis 950 of the chart represents kiloelectron volts, and the independent y-axis 952 represents counts. For reference, spectrum one 954 registers approximately 72 counts at approximately 0.943 keV. Spectrum one 954 represents the results of directing an electron beam 904 at the first portion 928 of the coupon described in the discussion associated with FIG. 9B. Spectrum two 956 represents the results of directing an electron beam 904 at the second portion 930 of the coupon described in the discussion associated with FIG. 9B. Table 1 is a reference table showing the correspondence on the chart between elements and X-ray measurements.

TABLE 1

| Element | Atomic Number | X-ray Line(s) |
|---|---|---|
| Carbon (C) | 6 | 0.277 keV (Kα) |
| Oxygen (O) | 8 | 0.524 keV (Kα) |
| Sodium (Na) | 11 | 1.041 keV (Kα) |
| Aluminum (Al) | 13 | 1.487 keV (Kα) |
| Titanium (Ti) | 22 | 4.509 keV (Kα) |
| Titanium (Ti) | 22 | 0.277 keV (Lα) |

Thus FIG. 9C demonstrates that the etching process of the present subject matter substantially reduces instances of titanium on the coupon. The first portion 928, for example, registers titanium at 4.509 keV and 0.277 keV during X-ray detection, in various embodiments. The second portion 930, which has been etched, registers primarily aluminum, which is the substrate to which the titanium was once coated, in various embodiments. Overall, the chart demonstrates that the present subject matter provides for the removal of titanium. In various embodiments, removing titanium according to the present subject matter results in metals which are more suitable for creating welds without titanium components which can affect aging, in various embodiments.

Figure 10:
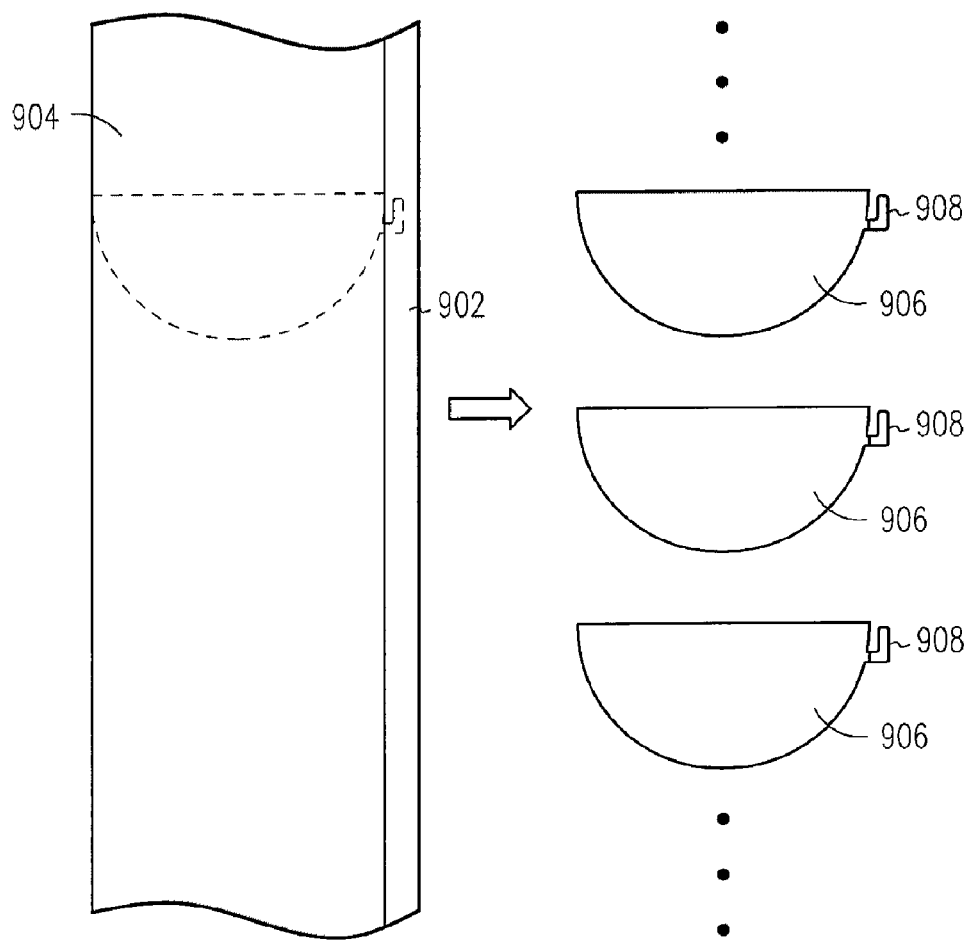
FIG. 10 illustrates an example of an etched foil, according to one embodiment of the present subject matter.

FIG. 10 illustrates an example of an etched foil, according to one embodiment of the present subject matter. In various embodiments, a roll of cathode substrate is coated with titanium 904. In some embodiments, a portion of the roll is substantially free of titanium 902. In various embodiments, cathodes are cut from the roll of cathode substrate. Cutting can include punching, water jet cutting, laser cutting, or other forms of removing shapes from a sheet or roll. In various embodiments, cathode layers include a portion covered in titanium 906, and a portion not covered in titanium 908. In various embodiments, the illustrated shapes can be combined and connected using the teachings of the present application, but additional methods of combining cathodes and anodes are within the scope of the present subject matter. The roll is continuous, in various embodiments, and in additional embodiments, the roll is finite. In some embodiments, a sheet shape is used instead of a roll. Although three shapes are demonstrated in the example illustration, various additional embodiments include more or less shapes.

Generally, the present application teaches various processes adapted to produce an electrode partially coated in titanium. Various verification methods taught herein are adapted to demonstrate that an electrode has been created which is partially coated in titanium. However, it should be understood that other processes are within the scope of the present subject matter. For example, various additional embodiments include removing titanium from an electrode using grinding, masking, electro-plating, embossing, cladding, coining, and other mechanical, electrical, electrochemical and chemical processes designed to produce a cathode with a partial titanium coating. The present subject matter includes, but is not limited to, additional teachings discussed on pages 102-106, 115-119 of related and commonly assigned Provisional U.S. Patent Application "Method and Apparatus for Single High Voltage Aluminum Capacitor Design," Ser. No. 60/588,905, filed on Jul. 16, 2004, incorporated herein by reference.

Figure 11:
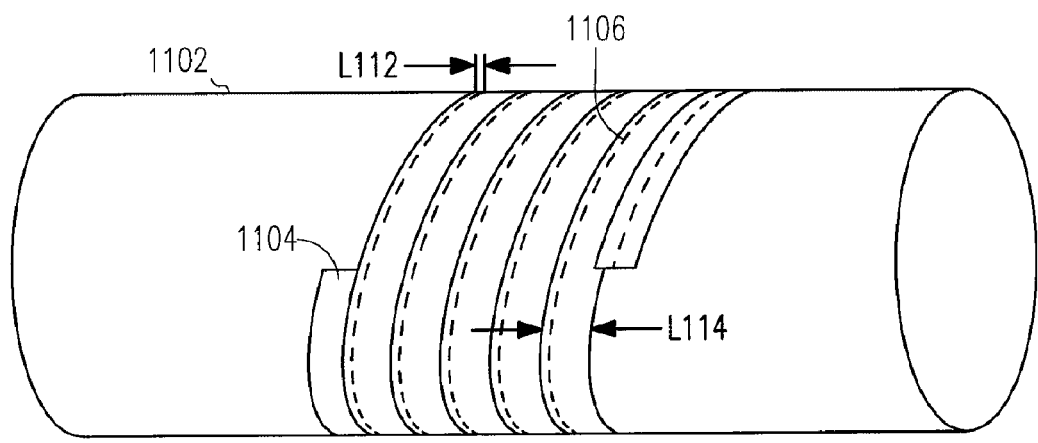
FIG. 11 demonstrates a vacuum deposition sputter process configuration, according to one embodiment of the present subject matter.

Additional methods apply titanium to only a portion of a substrate. FIG. 11 demonstrates a vacuum deposition sputter process configuration, according to one embodiment of the present subject matter. In various embodiments, an electrode is created by wrapping an elongate strip of substrate 1104 around a barrel mandrel 1102, and then applying titanium to the elongate substrate 1104. Various examples use an elongate substrate 1104 ranging from 30 to 40 mm in width L114, but other examples are within the scope of the present subject matter. In various embodiments, a vacuum deposition sputter process coats the elongate substrate 1104 with titanium. In some of these embodiments, the elongate substrate 1104 is wrapped around the mandrel with an overlap 1106 of a width L112 which is less than the width Li 14 of the elongate substrate. As titanium is applied to the elongate substrate 1104, this overlap has a mask effect, defining a portion of the elongate substrate 1104 which is not covered with titanium. Electrodes are then excised from the elongate strip 1104 such that the portion which is substantially free of titanium is positioned for further uses which require an absence of titanium.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments, and various embodiments, will be apparent to those of skill in the art upon reviewing the above description. The scope of the present subject matter should be determined with reference to the appended claims, along with the full scope of equivalents to which such claims are entitled.

What is claimed is:

1. A method, comprising:
    wrapping a mandrel with an elongate strip of substrate such that the substrate at least partially overlaps;
    applying titanium to the substrate;
    excising a plurality of cathodes from the substrate;
    stacking a first cathode of the plurality of cathodes, a second cathode of the plurality of cathodes, and a plurality of anode layers into a capacitor stack, with a first masked cathode edge and a second cathode edge in alignment and defining a cathode connection surface for connection of the first cathode and the second cathode; and
    connecting the first cathode and the second cathode along the cathode connection surface.

2. The method of claim 1, wherein the plurality of anode layers are stacked in alignment, and the cathode connection surface is part of an anode connection surface defined by the plurality of anode layers.

3. The method of claim 1, wherein connecting the first cathode and the second cathode includes forming a weld on the cathode connection surface, the weld substantially free of titanium.

4. The method of claim 1, further comprising:
    stacking the first cathode, the second cathode, and the plurality of anode layers such that a cathode connection member on each of the cathode layers at least partially overlaps an anode connection member on each of the anode layers;
    connecting the cathode connection members together with the anode connection members; and
    electrically isolating the anode layers from the cathode layers.

5. The method of claim 4, wherein electrically isolating the anode layers from cathode layers includes cutting only cathodes.

6. The method of claim 1, further comprising disposing the capacitor stack into a capacitor case and connecting at least the first cathode to the capacitor case.

7. The method of claim 6, further comprising disposing the capacitor case in a hermetically sealed implantable medical device and electrically connecting the first cathode and the plurality of anode layers to electronics of the hermetically sealed implantable medical device.

8. The method of claim 3, further comprising disposing an interconnection member along the cathode connection surface and forming the weld between the interconnection member and the cathode connection surface.

9. The method of claim 1, further comprising disposing the capacitor stack into a capacitor case and connecting at least the first cathode to the capacitor case.

10. The method of claim 9, further comprising disposing the capacitor case in a hermetically sealed implantable medical device and electrically connecting the first cathode and the plurality of anode layers to electronics of the hermetically sealed implantable medical device.

11. The method of claim 3, wherein forming a weld includes laser welding.

12. The method of claim 3, further comprising aging the capacitor stack after forming the weld.

13. The method of claim 4, wherein electrically isolating the anode layers from cathode includes cutting anodes and cathodes.

14. The method of claim 1, further comprising:
    arranging the first cathode and at least a first anode layer into a first element;
    arranging the second cathode and at least a second anode layer into a second element; and
    stacking the first element and the second element in alignment, with a first element edge and a second element edge defining the cathode connection surface.

15. The method of claim 1, wherein the elongate strip is from 30 to 40 millimeters in width.

16. The method of claim 1, wherein applying titanium includes vacuum deposition sputtering titanium to the substrate.

17. The method of claim 9, further comprising connecting the plurality of anode layers to a feedthrough for electrically connecting the plurality of anodes to circuitry outside the capacitor case.

18. The method of claim 9, wherein the capacitor stack is connected to deliver a packaged energy density ranging from about 5.3 joules per cubic centimeter of capacitor stack volume to about 6.3 joules per cubic centimeter of capacitor stack volume.

19. The method of claim 1, further comprising etching the plurality of anode layers such that the capacitor stack delivers between 7.0 joules per cubic centimeter of capacitor stack volume and 8.5 joules per cubic centimeter of capacitor stack volume at a voltage between about 410 volts to about 610 volts.

20. The method of claim 19, further comprising etching the plurality of anode layers such that the capacitor stack has a capacitance of between approximately 0.70 microfarads per square centimeter and 0.85 microfarads per square centimeter when charged to approximately 550 volts.

21. The method of claim 1, further comprising:
    forming a hydrous oxide layer on the plurality of anode layers;
    anodizing the plurality of anode layers in a bath containing an aqueous solution of approximately 10 to approximately 120 grams per liter boric acid and approximately 2 to approximately 50 parts per million phosphate as electrolyte at a pH of 4.0 to 6.0 and a temperature of approximately 85 degrees Celsius to approximately 95 degrees Celsius, whereby said anode layers can be anodized to approximately 760 V without scintillation; and interrupting the anodizing process to stabilize the plurality of anode layers in a mildly alkaline bath.

22. The method of claim 21 wherein the anodization occurs from approximately 600 volts to approximately 760 volts.

* * * * *